US010268199B2

(12) United States Patent
Dudar

(10) Patent No.: US 10,268,199 B2
(45) Date of Patent: Apr. 23, 2019

(54) MANAGING VEHICLE REFUELING OPERATIONS

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 64 days.

(21) Appl. No.: 15/238,143

(22) Filed: Aug. 16, 2016

(65) Prior Publication Data
US 2018/0052467 A1 Feb. 22, 2018

(51) Int. Cl.
| | | |
|---|---|---|
| G01M 17/00 | (2006.01) |
| G05D 1/02 | (2006.01) |
| B60K 15/03 | (2006.01) |
| G07C 5/08 | (2006.01) |
| G07C 5/00 | (2006.01) |

(52) U.S. Cl.
CPC ........... G05D 1/0217 (2013.01); B60K 15/03 (2013.01); G07C 5/0808 (2013.01); *B60K 2015/03203* (2013.01); *B60K 2015/03217* (2013.01); *G05D 2201/0212* (2013.01); *G07C 5/008* (2013.01)

(58) Field of Classification Search
CPC ................. G05D 1/0217; B60K 15/03; B60K 2015/03203; B60K 2015/03217; G07C 5/008
USPC .................................... 701/29; 123/520, 521
See application file for complete search history.

(56) References Cited

U.S. PATENT DOCUMENTS

| | | | |
|---|---|---|---|
| 5,245,973 A | 9/1993 | Otsuka et al. | |
| 5,750,888 A * | 5/1998 | Matsumoto | ........ F02M 25/0809 73/114.39 |
| 5,806,500 A * | 9/1998 | Fargo | ................... F02M 25/089 123/198 D |
| 5,868,179 A | 2/1999 | Hartsell, Jr. | |
| 5,947,089 A * | 9/1999 | Joyce | .................... F02D 41/222 123/479 |
| 6,467,470 B1 * | 10/2002 | Carlsson | ............. F02D 19/0684 123/179.14 |
| 7,347,191 B2 * | 3/2008 | Atwood | ............... B60K 15/035 123/516 |
| 9,546,894 B2 * | 1/2017 | Dudar | ..................... G01F 23/18 |
| 2010/0122750 A1 * | 5/2010 | Erben | ...................... B64F 1/28 141/95 |
| 2010/0224171 A1 * | 9/2010 | Peters | ................ F02M 25/0836 123/520 |

(Continued)

FOREIGN PATENT DOCUMENTS

| | | |
|---|---|---|
| EP | 2186730 A2 | 5/2010 |
| GB | 2321639 A | 8/1998 |

OTHER PUBLICATIONS

UK Search Reported dated Jan. 31, 2018 re GB 1713029.5.

*Primary Examiner* — Shardul D Patel
(74) *Attorney, Agent, or Firm* — Frank A. MacKenzie; Bejin Bieneman PLC

(57) ABSTRACT

A computer for a vehicle is programmed to receive fuel level data over a period of time during a refueling operation. Based on the fuel level data, the computer determines that fuel flow rate during one portion of the refueling operation is materially reduced relative to other portions of the refueling operation. The computer is programmed to output a failure mode based on the determination.

20 Claims, 6 Drawing Sheets

(56) References Cited

U.S. PATENT DOCUMENTS

| | | | |
|---|---|---|---|
| 2011/0168140 A1* | 7/2011 | DeBastos | F02M 25/0818 |
| | | | 123/521 |
| 2014/0130659 A1* | 5/2014 | Fukushima | B60T 8/3265 |
| | | | 91/369.1 |
| 2014/0272671 A1 | 9/2014 | Handa et al. | |
| 2015/0142293 A1* | 5/2015 | Dudar | G01M 15/05 |
| | | | 701/101 |
| 2016/0082832 A1* | 3/2016 | Dudar | B60K 15/077 |
| | | | 206/459.1 |
| 2016/0305611 A1 | 10/2016 | Handa | |
| 2016/0371704 A1* | 12/2016 | Akgun | G06F 17/30368 |

* cited by examiner

MANAGING VEHICLE REFUELING OPERATIONS

BACKGROUND

In a vehicle, an evaporation emission control (EVAP) system sometimes becomes restricted, i.e., blocked or partly blocked, causing pressure to build up in the fuel tank during refueling operations. The pressure build-up may cause the fuel pump to prematurely and repeatedly shut off, resulting in inconvenience and agitation for the user. Fuel pumps and fueling locations may also have failure modes, such as failing pressure sensors, a fuel pressure that is too high, that can cause the fuel pump to prematurely shut off. Some vehicles include a sensor for detecting this undesired pressure build-up, allowing the vehicle to alert the user to the restricted condition of the EVAP system. However, some vehicles do not include this sensor, and in vehicles that include this sensor, the sensor may fail. Further, in the case of autonomous vehicles, fueling may take place without an operator. No one may notice that the EVAP system is restricted or that the fuel pump has a failure mode.

DESCRIPTION

Introduction

Figure 1:
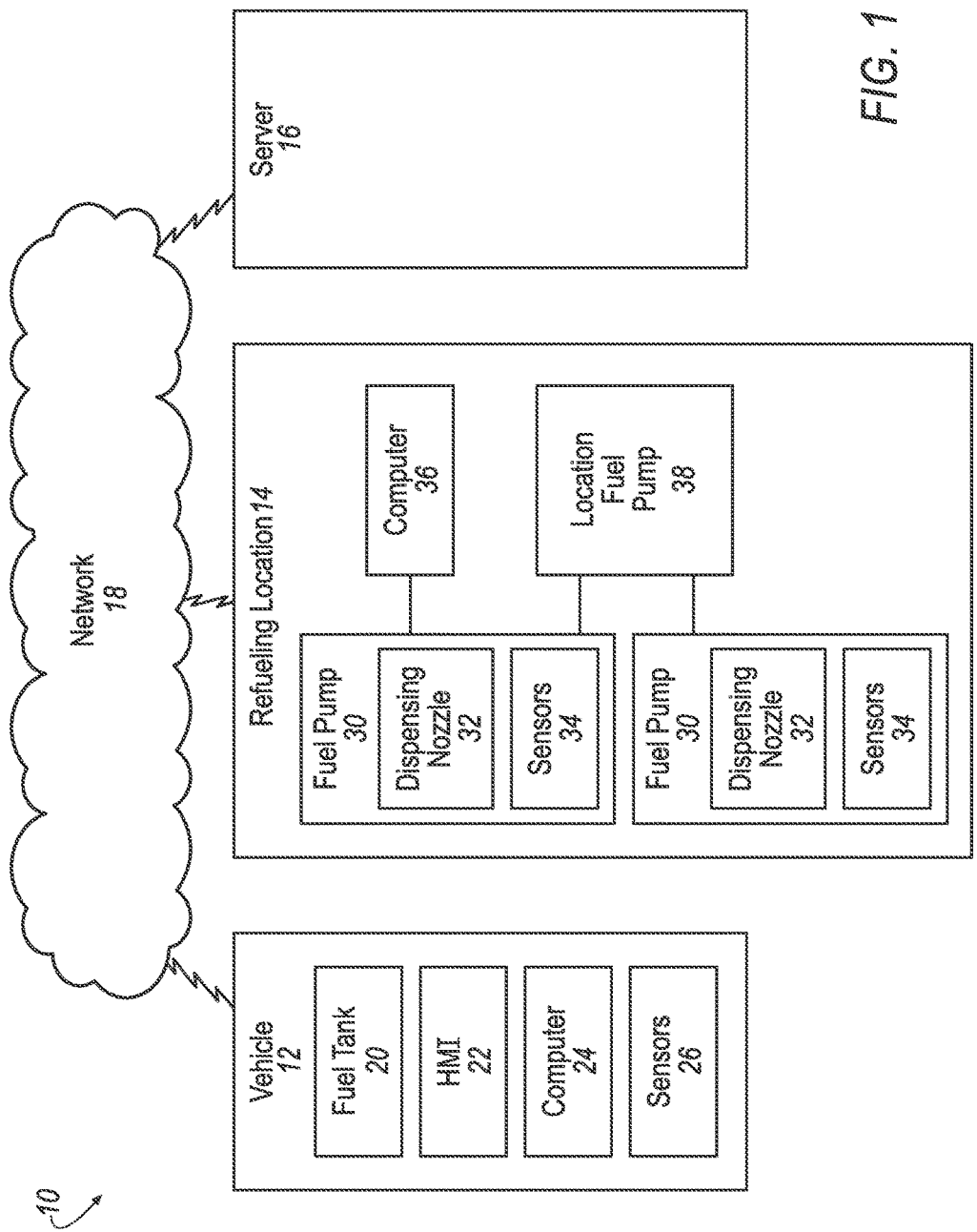
FIG. 1 is a diagram of an exemplary system for managing a refueling operation.

A system 10 for managing refueling operations of a first vehicle 12 is shown in FIG. 1. The system 10 includes the first vehicle 12, one or more second vehicles 12, one or more refueling locations 14, and a server 16. The refueling locations 14 include one or more fuel pumps 30.

During a refueling operation, a fuel level sensor 22 in the first vehicle 12 substantially continuously monitors a fuel level in a fuel tank 20 and provides fuel level data to a computer 24 in the first vehicle 12. "Substantially continuously", is defined herein to mean at a sufficiently high sample rate that an evaluation can be made of the resulting data regarding the occurrence of overpressure shut-off events, as described below. For example, if an overpressure shut-off event is a minimum of 100 milliseconds in duration, and it is desired by the system to measure the length of an overpressure shut-off event with an accuracy of +/−10%, then a sample rate of one sample every 10 milliseconds (100 Hertz) would be a sufficiently high sample rate.

The fuel level is expressed as a percentage, and is defined as follows:

$$\text{fuel level} = \text{volume of fuel in the tank}/\text{fuel tank capacity} \qquad \text{Eqn. 1}$$

Based on the fuel level data, the computer 24 is programmed to plot the fuel level over some or substantially all of the time of the refueling operation, and to determine whether the refueling operation operated within an expected range. The expected range may be, for example, that the fuel level increases substantially linearly, and at a rate within in a predetermined range. The rate may be evaluated from a beginning to an end of the refueling operation, or within a determined period of the refueling operation, as discussed in additional detail below.

The determined period of the refueling operation may be determined based on one or both of a beginning time and an end time of the refueling operation. For example, a period of the refueling operation may be determined based on the beginning time and the end time. The determined period may include a middle period of the refueling period from 10% to 90%, calculated based on time.

As another example, the determined period may be determined based on predetermined fuel levels, for example, a period between a 10% fuel level and a 90% fuel level.

As discussed below, failure modes such as a restricted ventilation mechanism for the first vehicle 12 fuel tank 20, or a faulty sensor on the fuel pump 30, may result in one or more overpressure shut-offs of the fuel pump 30 during the refueling operation. These overpressure shut-offs appear as nonlinearities in the fuel level during the refueling operation.

Upon completing the refueling operation, the first vehicle 12 computer 24 is programmed to update refueling records associated with the first vehicle 12 and further updates records associated with the refueling location 14. The records may be maintained in one or any combination of the first vehicle 12 computer 24, the refueling location 14 computer 36 and the server 16. Based on the records, a computing device, e.g., the first vehicle 12 computer 24 is programmed to determine whether the first vehicle 12 is operating within a specified range during a refueling operation, or exhibits a failure mode. Further, based on the records, a computing device, such as the first vehicle 12 computer 24 or the server 16, can determine whether a fuel pump 30 and/or refueling location 14 is operating within a specified range during refueling operations, or exhibits a failure mode.

System Elements

The first vehicle 12 is generally a land-based first vehicle 12 having three or more wheels, e.g., a passenger car, light truck, etc. The first vehicle 12 includes a fuel tank 20, one or more sensors 22, a computer 24 and a human-machine interface (HMI) 26. The one or more sensors 22 and the HMI 26 are communicatively coupled to the computer 24 as described below.

The computer 24 includes a processor and a memory. The memory includes one or more types of computer-readable media, and storing instructions executable by the processor for performing various operations, including as disclosed herein. Further, the computer 24 may include and/or be communicatively coupled to one or more other computers, including vehicle components such as the sensors 22 and the HMI 26 which likewise as is known may include respective processors and memories. Communications may be performed via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

The sensors 22 may be programmed to collect data related to the first vehicle 12 and the environment in which the first vehicle 12 is operating. By way of example, and not limitation, sensors 22 may include fuel level sensors, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, a global positioning system (GPS), etc.

One or more sensors 22 may be programmed to collect data related the fuel level in the first vehicle 12. For example, a mechanical fuel level sensor 22 such as a float arm mechanism 22, as is known, that floats on a surface of the fuel may be used to detect the fuel level. As another example, one or more sensors 22 such as a camera, an infrared sensing system, an ultrasonic sensing system, etc. may be programmed to detect the fuel level in the first vehicle 12.

The sensors 22 are programmed to provide data, such as fuel level data, to the computer 24. As described in detail below, during refueling operations, the computer 20 may determine, based on the fuel level data, whether the refueling operation is proceeding within a specified range of operation.

Additionally, one or more sensors 22 may collect global positioning data indicating a location of the first vehicle 12 and provide the global positioning data to the first vehicle 12 computer 24. As described below, the first vehicle 12 computer 24 may determine, based on the data, a proximity of the first vehicle 12 to a refueling location 14 or fuel pump 30 within the refueling location 14.

The first vehicle 12 human machine interface (HMI) 26 is communicatively coupled to the computer 24 in a known manner such as described above and includes one or more output devices such as a display, lamps, speakers, etc., for communicating data to a user. The HMI 26 further includes one or more input devices such as a touch screen display, buttons, a mouse, a keyboard, a microphone, a gesture recognition device, switches, etc., for receiving input from the user.

The first vehicle 12 computer 24 may communicate to the user via the HMI 26. For example, the first vehicle 12 computer 24 may activate a warning lamp 26, or display a warning on a display screen indicating that the first vehicle 12 EVAP system may require servicing.

The system 10 may include one or more second vehicles 12. Each of the second vehicles 12 may include a fuel tank, sensors, computer, and HMI, similar to the first vehicle 12. Each of the second vehicles 12 may include a computer 24 programmed to perform each of the operations described with regard to the first vehicle 12.

The refueling location 14 may include one or more fuel pumps 30, a computer 36 and a primary pump 38.

Each of the one or more fuel pumps 30 includes a dispensing nozzle 32 and one or more sensors 34. The dispensing nozzle 32 can be inserted into a filler neck 46 (FIG. 2) of the first vehicle 12 fuel tank 20 for dispensing fuel to the first vehicle 12.

The one or more sensors 34 are communicatively coupled with the computer 36, and are programmed to detect a pressure level in the dispensing nozzle 32 during refueling operations. The sensor 34 monitors the pressure level, and provides data to the computer 36 indicating the pressure level.

Each refueling location 14 may include a computer 36. The computer 36 is programmed to operate the one or more fuel pumps 30. The computer 36 is further programmed to communicate with the first vehicle 12 computer 24 via the network 18. For example, the refueling location 14 computer 36 may provide identification information related to the refueling location 14 and/or a fuel pump 30 to the first vehicle 12 computer 24. The refueling location 14 computer 36 may further be programmed to coordinate refueling operations, together with the first vehicle 12 computer 24.

For example, the refueling location 14 computer 36 may initiate or end refueling operations based on input received from the first vehicle 12 computer 24.

During refueling operations, the computer 36 receives data from a sensor 34 indicating the pressure level in the fuel pump 30 dispensing nozzle. In the case that the indicated pressure level is above a shut-off threshold, the computer 36, instructs the fuel pump 30 to shut off, as is known. The indicated pressure level may be above the shut-off threshold due to pressure within the fuel tank 20 building up beyond the threshold level. Additionally or alternatively, the indicated pressure level (as indicated by the sensor) may be too high due to a faulty sensor 34. Other failure modes, such as too-high fuel pressure from the fuel pump 30 may also result in the indicated pressure level being above the shut-off threshold. Shutting off the refueling operation due to an overpressure detection is referred to herein as an overpressure shut-off.

The pressure level rising above the shut-off threshold may indicate that the fuel tank 20 is full. Full in this context may mean, for example, that the fuel tank 20 contains at least a fixed percentage of its capacity, for example 98%. In other cases, the pressure level may rise to the shut-off threshold when the fuel tank is not yet full. This may indicate that a ventilation mechanism 52 (FIG. 2) for the fuel tank 20 is clogged or partially clogged. This may also indicate a failure mode associated with the fuel pump 30 or the refueling location 14.

In the case of a refueling operation controlled by a user, upon detecting that the refueling process has stopped, the user may restart the refueling operation by manually by reactivating the dispensing nozzle 32. Refueling may continue until the pressure level again rises above the shut-off threshold. In the case of a clogged ventilation mechanism 52 (FIG. 2) or other failure mode, the user may need to repeat this process multiple times in order to fill the fuel tank 20. As described below, this may result in one portion of the refueling operation having a materially reduced fuel flow relative to other portions of the refueling operation, with the fuel level increasing at a linear rate during portions of the refueling operation and the fuel level remaining constant at a fixed level during other portions of the refueling operation. A materially reduced fuel flow means herein that the reduction in the fuel flow rate is indicative of a disruption in the refueling process such as a shut-off of the fuel pump 30 due to an overpressure detection. The computer 36 is typically programmed to disregard fuel flow reductions that are not material, i.e., within a threshold that can be empirically determined to represent an amount by which pressure and/or a flow rate would normally fluctuate due to factors such as air in a fuel line, etc., during refueling.

In the case of autonomous operation, the refueling location 14 computer 36 may be programmed to restart the refueling operation, for example, after a predetermined period of time. The predetermined period of time may be, for example, a fixed time such as one second. This cycle of shutting off and restarting the refueling operation may repeat multiple times during the refueling operation. As with the case of a user controlled refueling operation, this may result in a discontinuous fuel flow during the refueling operation, with the fuel level increasing at a linear rate during portions of the refueling operation and the fuel level remaining constant at a fixed level during other portions of the refueling operation.

The refueling location 14 primary pump 38 pumps fuel from a fuel reservoir, e.g., an underground tank (not shown), to each of the fuel pumps 30. A fuel pressure provided by the primary pump 38 may affect operation of one or more of the fuel pumps 30 at the refueling location 14 during respective refueling operations. For example, a fuel pressure that is higher than a fuel pressure specified range may cause a fuel flow rate from the fuel pump 30 to the first vehicle 12 to be outside of a flow rate specified range. As a consequence, the fuel tank 20 pressure level may rise above the shut-off threshold and trigger an overpressure shut-off of the refueling operation.

As the primary pump 38 provides fuel pressure to multiple fuel pumps 30, one or more of the fuel pumps 30 at the refueling location 14 may exhibit a flow rate outside of the flow rate specified range.

The server 16 is a computer including a processor and a memory, the memory storing instructions which may be executed by the processor. The server 16 can communicate, via the network 18 to the first vehicle 12 computer 24, the one or more second vehicle 12 computers 24, and the one or more refueling locations 14.

The server 16 is programmed to receive data related to refueling operations of the first vehicle 12 and the one or more second vehicles 12 (collectively, the vehicles 12) and store the data in a memory associated with the server 16. The data may include the identity of the refueling location 14 and/or the fuel pump 30 where a first vehicle 12 refueled, a time stamp of the refueling operation indicating a start time and an end time of the refueling operation, a quantity of fuel received by the first vehicle 12 during the refueling operation, weather conditions during the refueling operation, etc.

Additionally, the data may indicate whether a refueling operation was completed without a premature shut-off event. A refueling operation that was completed without a premature shut-off may be referred to herein as a successful refueling operation. Note that, as described below, not every overpressure shut-off is a premature shut-off event. For example, an overpressure shut-off event when the fuel tank 20 of the first vehicle 12 is full is intended, and does not indicate the presence of a failure mode. A premature shut-off event is defined as one or more overpressure shut-off events that occur during a determined portion of the refueling operation during which an overpressure shut-off is not expected.

As described below, the first vehicle 12 computer 24 may monitor the fuel level during the refueling operation. In the case that the refueling operation is interrupted by one or more unexpected overpressure shut-offs, the first vehicle 12 computer 24 may determine that a pre-mature shut-off event occurred. On the other hand, in the case of a substantially linear increase in fuel level for a selected portion of the refueling operation, the first vehicle 12 computer 24 may determine that the refueling operation was completed without a premature shut-off event.

The server 16 is programmed to store the data such that the server 16 or another computer such as the first vehicle 12 computer 24 can determine whether the first vehicle 12 can successfully complete a refueling operation or whether the first vehicle 12 has a failure mode impacting refueling operations.

Additionally, the server 16 is programmed to store the data such that the server 16 or the first vehicle 12 computer 24 can determine whether a fuel pump 30 and/or a refueling location 14 can successfully complete a refueling operation, or whether the fuel pump 30 and/or refueling location 14 has a failure mode impacting refueling operations.

The server 16 may provide the data, for example to the user of the first vehicle 12, via the HMI 26. Based on data that the first vehicle 12 has a failure mode impacting a refueling operation, the user may have the first vehicle 12 serviced. Based on the data, for example, that a particular fuel pump 30 or refueling location 14 cannot successfully complete a refueling operation, the user of the first vehicle 12 may select an alternate fuel pump 30 or an alternate refueling location 14 for refueling.

In the case of an autonomous first vehicle 12, the server 16 may send instructions to the first vehicle 12 computer 24 to navigate the first vehicle 12 to a service station in the case that the server 16 determines that the first vehicle 12 may require servicing. An autonomous vehicle 12 is a vehicle 12 that is capable of sensing its environment and navigating without human input. Typically in an autonomous vehicle 12 the computer 36 controls each of vehicle 12 steering, propulsion (e.g., a powertrain with electric and/or internal combustion elements), and braking. A non-autonomous vehicle 12 is a vehicle 12 which depends on human sensing of the environment and human input for navigation. A semi-autonomous vehicle 12 is capable of sensing some elements in its environment and controlling some vehicle operations, such as anti-lock braking, or cruise control, without human input. In a semi-autonomous vehicle 12, the computer 36 controls one or more, but not all, of propulsion, steering, and braking.

In the case that the server 16 determines that a fuel pump 30 or refueling location 14 has a failure mode, the server 16 may instruct the first vehicle 12 to refuel at a different fuel pump 30 or different refueling location 14.

The network 18 represents one or more mechanisms by which the first vehicle 12, one or more second vehicles 12, the one or more refueling locations 14 and the server 16 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The types of wireless communications may include one or more of cellular, Bluetooth, IEEE 802.11 (typically, Wi-Fi), dedicated short range communications (DSRC), two-way satellite (e.g., emergency services), one-way satellite (e.g., receiving digital audio radio broadcasts), AM/FM radio, etc.

Figure 2:
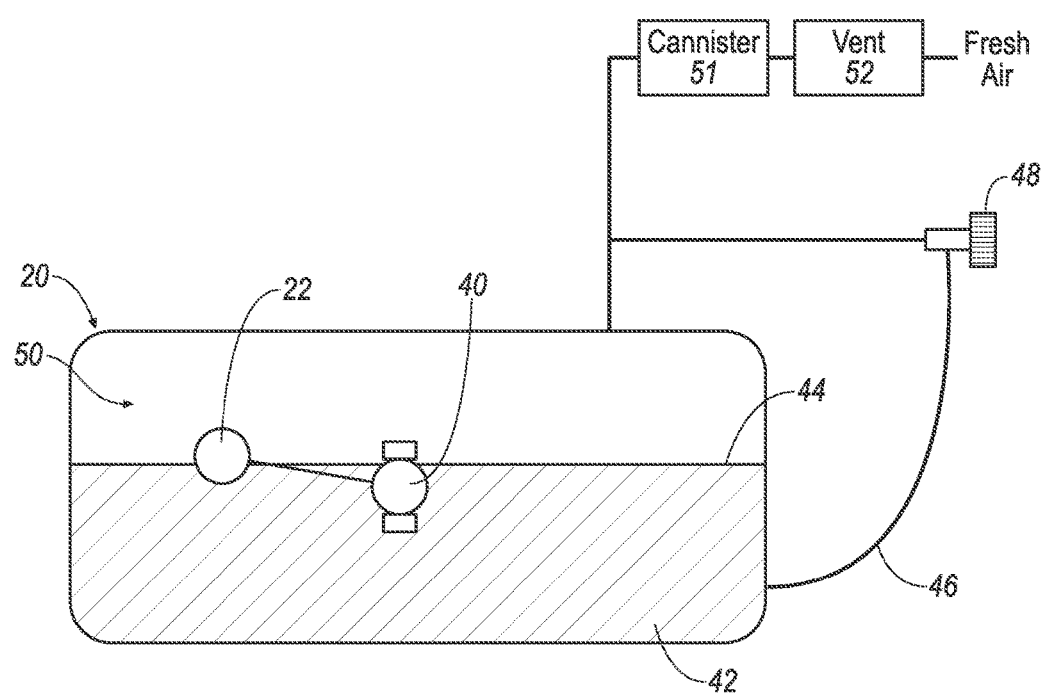
FIG. 2 is a side view of an exemplary fuel tank.

FIG. 2 is a schematic drawing of the first vehicle 12 fuel tank 20. The fuel tank 20 includes the sensor 22. The sensor 22, as shown, floats on a fuel top surface 44 of the fuel 42. The fuel sensor 22 detects a level of the fuel 42 and transmits the level to the first vehicle 12 computer 24.

The fuel tank 20 includes a filler neck 46 and a fuel cap 48, and further includes a canister 51 and a ventilation mechanism 52. The fuel tank 20 and the fuel top surface 44 together define a vapor space 50. During refueling, the fuel cap 48 is removed, and the dispensing nozzle 32 of the fuel pump 30 is inserted into the filler neck 46.

During refueling, in the case that the ventilation mechanism 52 is totally or partially blocked, pressure may build up in the vapor space 50. The increased pressure may be detected by the fuel pump 30 sensor 34, triggering an overpressure shut-off.

Figure 3:
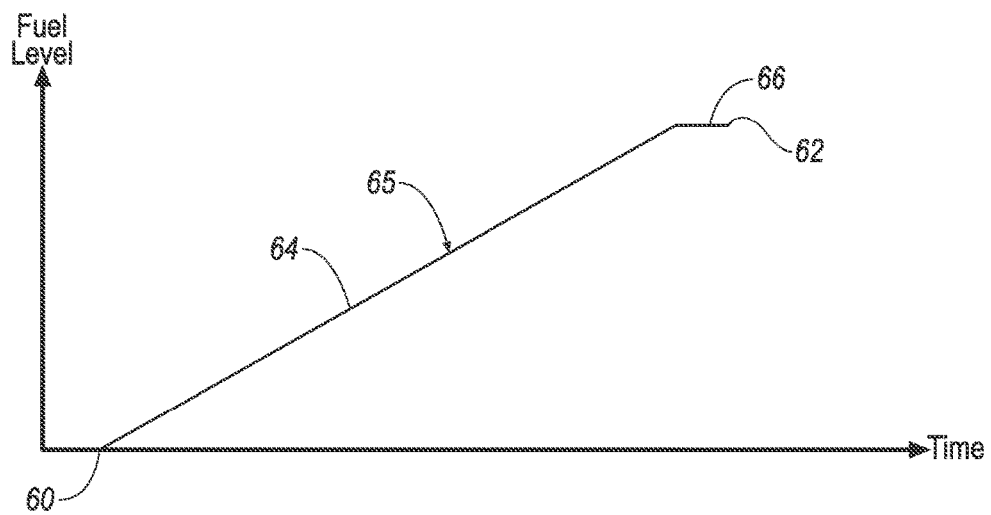
FIG. 3 is an exemplary graph of fuel level in a fuel tank during a refueling operation without a premature shut-off.

FIG. 3 is an exemplary graph of a linear refueling operation. After the first time 60 of the refueling operation, which indicates a beginning of the refueling operation, a first portion 64 of a graph of the fuel level 65 increases substantially linearly. The graph of the fuel level 65 represents a fill percentage of the fuel tank 20. The fuel level 65 may increase at a rate reflecting a fuel flow rate into the fuel tank 20 of, e.g., ten gallons per minute. A specified range for the fuel flow rate may be between four gallons per minute and 12 gallons per minute.

The fuel level 65 may continue to increase linearly until the fuel tank 20 is full. As further shown in FIG. 3, the graph of the fuel level 65 may include one or more second portions 66 during which the fuel level is substantially constant. As shown in FIG. 3, this may occur when the fuel tank 20 is full. As described above, a fuel tank 20 that is full may be defined as a fuel tank containing at least a fixed percentage of its capacity, for example 98%. The refueling operation has an end time 62. This may be the time that the user or a fuel pump 30 discontinues the refueling operation.

Figure 4:
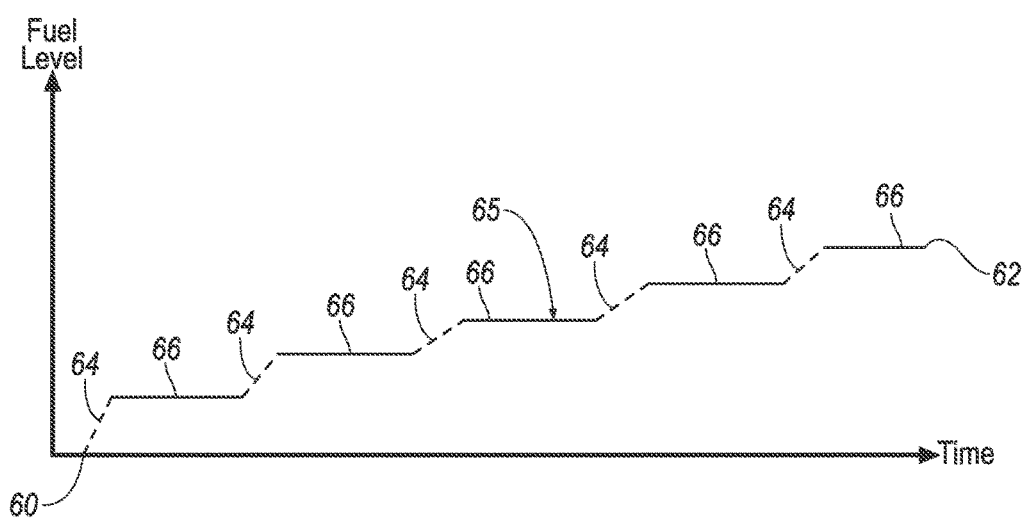
FIG. 4 is an exemplary graph of a fuel level in a fuel tank during a refueling operation that included a premature shut-off.

FIG. 4 is an exemplary graph of an exemplary refueling operation including discontinuities in the fuel flow. After the first time 60 (beginning) of the refueling operation, there are multiple first portions 64 of the refueling operation during which the fuel level increases substantially linearly. As above, during each of these first portions 64, the fuel level may increase at a rate reflecting a first fuel flow rate into the fuel tank 20 of, for example, ten gallons per minute. A first specified range for the first fuel flow rate may be between four gallons per minute and 12 gallons per minute. The computer 24 may identify a first portion 64 as a portion, longer than a predetermined period of time, for example 100 milliseconds, during which the first fuel flow rate was within the specified first range. Alternatively, the computer 24 may identify the first portion 64 as the portion, longer than the predetermined time period, during which the first fuel flow rate is greater than a first fuel flow threshold, e.g. four gallons per minute.

However, in the exemplary refueling operation shown in FIG. 4, second portions 66 occur between pairs of first portions 64. During the second portions 66, the fuel level remains substantially constant, reflecting a fuel flow rate of zero. A second specified range for a second flow rate during the second portions may be, for example, a second range of zero gallons per minute+/−0.1 gallons per minute, to allow for possible movement (sloshing due to wind, or people getting into or out of the first vehicle 12, etc.) of the fuel 42 in the fuel tank 20 during the second portions 66. The computer 24 may identify a second portion 66 as a portion, longer than a predetermined period of time, for example 100 milliseconds, during which the second fuel flow rate was within the range. Alternatively, the computer 24 may identify the second portion 66 as the portion, longer than the predetermined period of time, during which the second fuel flow rate is less a second fuel flow threshold, e.g., 0.1 gallons per minute.

Each second portion 66 which follows a first portion 64 indicates that an overpressure shut-off has occurred.

As described in additional detail below, in order to account for potential discontinuous fuel flow when the refueling process is started or when the fuel tank 20 is almost full, one or more periods of the refueling operation may be excluded from the determination of linear fuel level increase (i.e., continuous fuel flow). For example, the flow rate for a first period of time during the refueling operation, or the flow rate when the fuel level is below a fixed percentage, for example 5%, may be excluded from determinations of the linear fuel level increase. As another example, the flow rate during a last period of time during the refueling operation, or the flow rate when the fuel level is above a fixed percentage, for example 98%, may be excluded from the determination of the linear fuel level increase.

Exemplary Process Flows

Figure 5A:
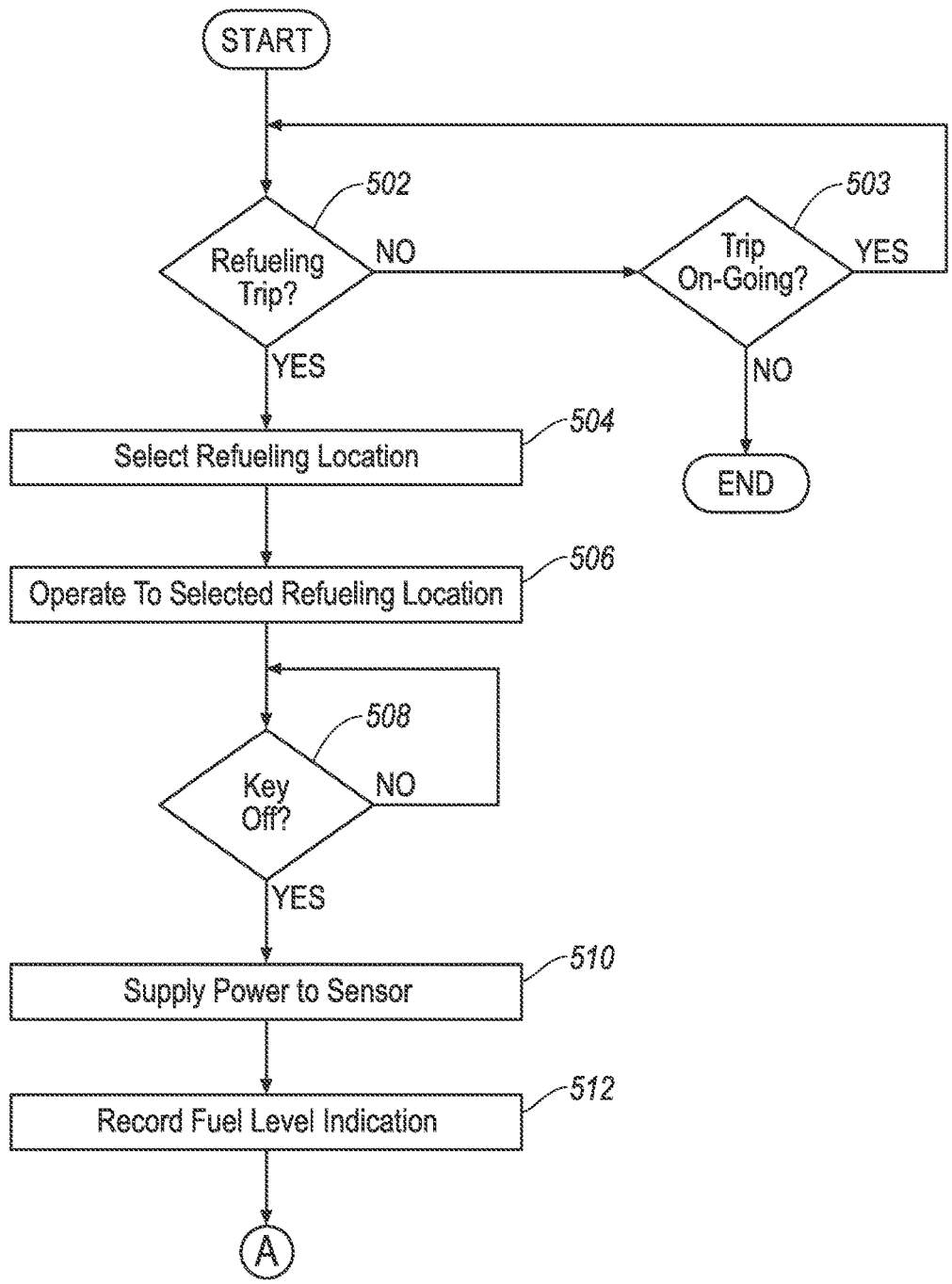
FIGS. 5A and 5B are a diagram of an exemplary process for managing a refueling operation.
Figure 5B:
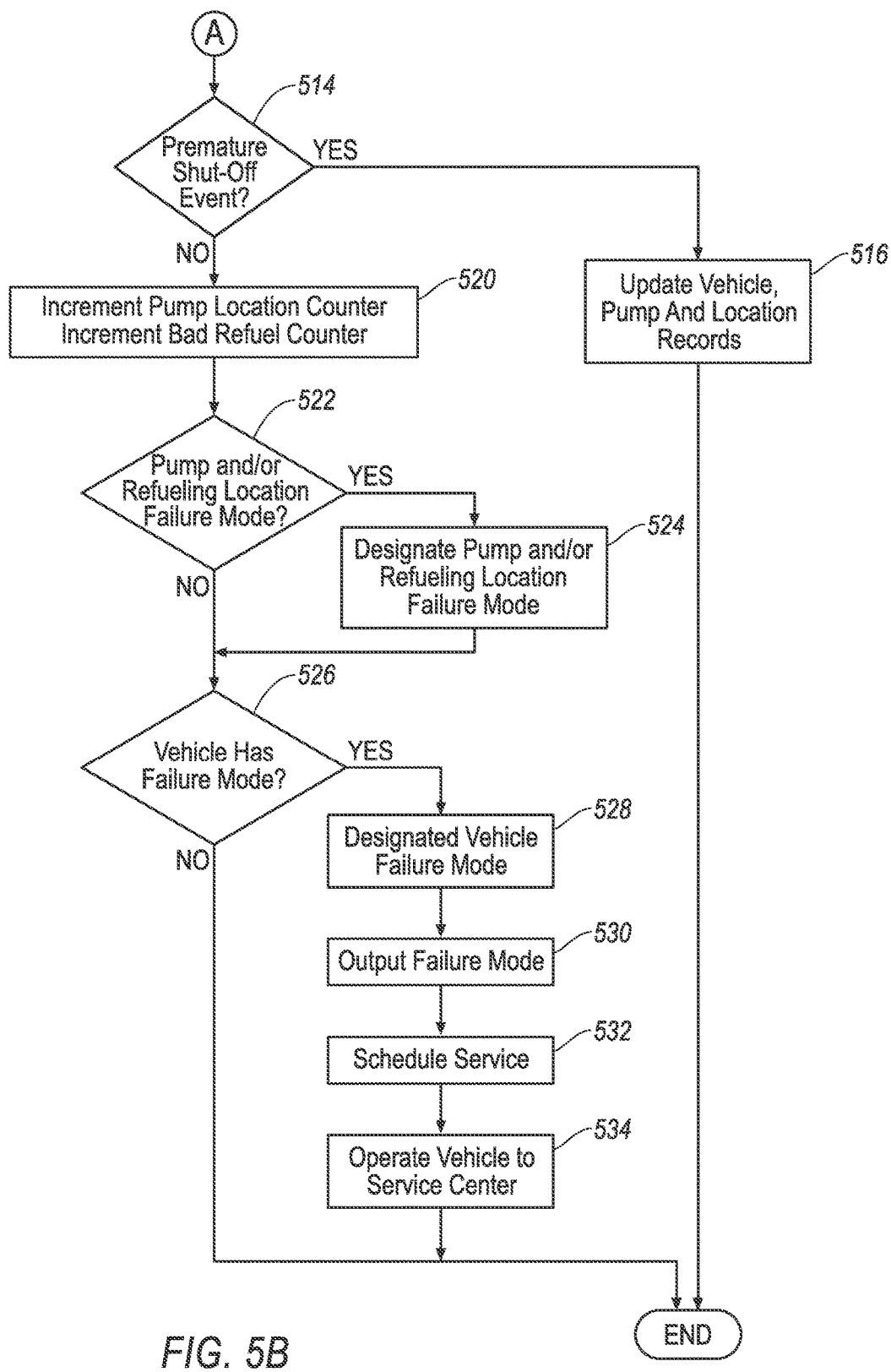

FIGS. 5A and 5B are a diagram respectively of an exemplary process 500 for managing refueling operations for the first vehicle 12. The process 500 starts in a block 502.

In the block 502, the first vehicle 12 computer 24 determines whether a current trip is a refueling trip. For example, in the case of a non-autonomous vehicle 12, the computer 24 may receive a refueling location 14 as a destination for the trip and determine based on the destination that the trip is a refueling trip. As another example, the first vehicle 12 computer 24 may receive global positioning data indicating that the first vehicle 12 is entering a refueling location 14. Based on the global positioning data, the computer 24 may determine that the current trip is a refueling mission trip.

In the case of an autonomous first vehicle 12, the computer 24 may receive instructions from a user or from the server 16 indicating that the first vehicle 12 should refuel. Based on the instruction, the computer 24 is programmed to determine that the current trip is a refueling mission trip.

In the case that the computer 24 determines that the current trip is a refueling trip, the process 500 continues in a block 504. In the case that the computer 24 determines that the current trip is not a refueling trip, the process continues in the block 503.

In the block 503, the computer 24 determines whether the current trip is ongoing, based, for example on ignition data (i.e., whether an ignition is on or off). In the case that the vehicle 12 trip is ongoing, the process 500 continues in the block 502. In the case that the trip is no longer ongoing, the process 500 ends.

In the block 504, which follows from the block 502, the first vehicle 12 computer 24 selects a refueling location 14. For example, the computer 24 may have received a refueling location 14 as a destination as described with respect to the block 502. As another example, the computer 24 may receive input from a user indicating that the first vehicle 12 should proceed to a refueling location 14 and request that the computer 24 select the refueling location 14. The computer 24 may, for example based on map data, and global positioning data indicating a location of the first vehicle 12, use known techniques, i.e., for identifying and selecting various kinds of waypoints such as refueling stations, select a refueling location 14. Upon selecting the refueling location 14, the process 500 continues in a block 506.

In the block 506, the first vehicle 12 is navigated to the refueling location 14. In the case of non-autonomous operation, the user navigates the first vehicle 12 to the refueling location 14. In the case of autonomous operation, the computer 24 navigates the first vehicle 12 to the refueling location 14. Upon arriving at the refueling location 14, the process 500 continues in a block 508.

In a block 508, the computer 24 determines whether a key-off event has occurred. The computer 24 receives data from, for example, a first vehicle 12 ignition, indicating that the vehicle has been turned off. Upon determining that the vehicle is been turned off the process 500 continues in a block 510. In the case that key-off event has not yet been detected, the process 500 continues in the block 508.

In the block 510, the computer 24, based on the information that this is a refueling mission, and that the vehicle 12 has arrived at the refueling location 14, provides power to one or more sensors 26 for detecting the fuel level in the first vehicle 12. For example, the sensor 22 for detecting the fuel level in the first vehicle 12 may be a component in a power control module (PCM) such as is known, and the computer 24 may provide power to the power control module. Upon providing power to the sensor 22 for detecting the fuel level in the first vehicle 12, the process 500 continues in a block 512.

In the block 512, the first vehicle 12 receives fuel from a fuel pump 30 at the refueling location 14. During the refueling operation, the first vehicle 12 computer 24 receives data indicating a fuel level of the first vehicle 12 fuel tank 20 from the sensor 22. The first vehicle 12 computer 24 records the data until the refueling operation is completed. Upon the completion of the refueling operation and the recording of the fuel level data related to the refueling operation, the process 500 continues in a block 514.

In the block 514, the first vehicle 12 computer 24 determines whether a premature shutoff event has occurred during the refueling operation. For purposes of this disclosure, a premature shutoff event is defined as a refueling operation during which, in a selected period of the refueling operation during which a continuous fuel flow is expected, at least one overpressure shutoff event occurs.

Figure 6:
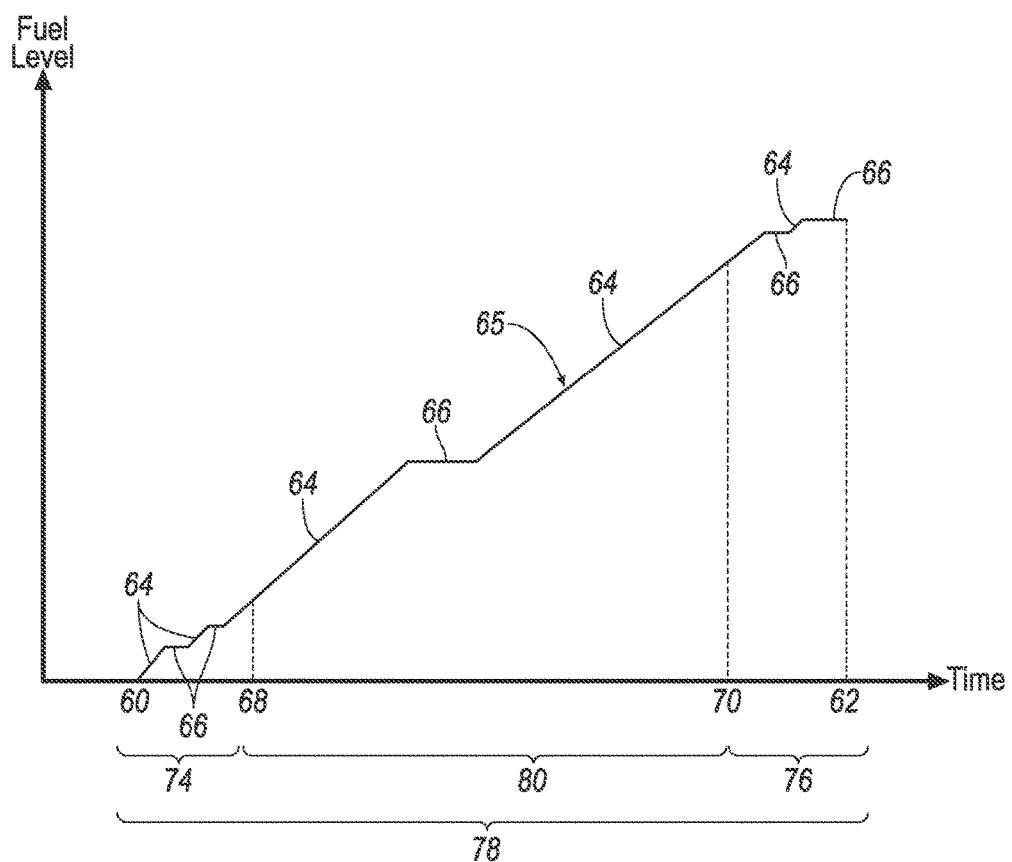
FIG. 6 is an exemplary graph of fuel level in a fuel tank during a refueling operation with beginning, middle and end time periods of the refueling operation indicated.

As shown in FIG. 6, a first period 74 of a refueling operation starts at first time 60 and ends at second time 68. A second period 80 starts at the second time 68 and ends at third time 70. A third period 76 starts at third time 70 and ends at fourth time 62.

During a refueling operation, it may be expected that one or more overpressure shutoff events occur during the first period 74 of the refueling operation and/or during a third period 76 refueling operation. For example, during the first period 74, when the dispensing nozzle has first been inserted and activated, one or more overpressure shutoff events can occur until a stabilized fuel flow is established. Similarly, during the third period 76 of the refueling operation, when the fuel tank 20 is close to full, one or more overpressure shutoff events can occur, for example, as the user or an autonomously operating fuel pump 30 attempts to continue to top off the fuel tank 20 after an initial overpressure shutoff event.

The computer 24 may determine the second period 80 of the refueling operation during which no overpressure shutoff event is expected in order to evaluate the refueling operation. For example, the computer 24 may exclude the first period 74 of the refueling operation and/or the third period 76 of the refueling operation and evaluate the remaining second period 80. The first period 74 of the refueling operation may be defined for example as the first fixed percentage, e.g., 10% of the time period 78 of the refueling operation and the third period 76 of the refueling operation may be defined as the last fixed percentage, e.g., 10%. The percentages may refer to the time period 78 of the refueling operation.

In the case, for example, the refueling operation had a time period 78 of 90 seconds, the first period 74 may be determined to be the first nine seconds of the refueling operation and the third period 76 may be determined to be the last nine seconds. As another example, in the case that the first vehicle 12 received ten gallons of fuel during the refueling operation, the first period 74 of the refueling operation may be the period during which the first vehicle 12 receives the first gallon of fuel and the third period 76 of the refueling operation may be the period during which the first vehicle 12 received the last gallon the fuel.

After identifying the second period 80 of the refueling operation during which no overpressure shutoff event is expected, the computer 24 evaluates the fuel level data from the second period 80 of the refueling operation. The computer 24 determines, based on the data, whether an overpressure shut-off has occurred during the second period 80 of the refueling operation. The computer 24 analyzes the data to determine whether discontinuities in the fuel flow occurred during the evaluated second period 80 of the refueling operation.

For example, the computer 24 may analyze the fuel level data and determine whether there one or more first portions 64 during which the fuel flow rate is within an expected range. The computer 24 determines the fuel flow rate based on the fuel level data. For example, if the fuel level data indicates that the fuel level has increased by 10% during a six second period, and fuel tank 20 capacity is 10 gallons, computer 24 determines that the first vehicle 12 received one gallon of fuel during the six second period. This is equivalent to a fuel flow rate of ten gallons per minute.

An expected fuel flow rate may be within a range of four gallons per minute to 12 gallons per minute. The computer 24 may analyze the fuel level data and determine that there are one or more first portions 64 during which the fuel flow rate is within the expected fuel flow rate.

Further, the computer 24 may analyze the data to determine whether there are one or more second portions 66 during which the fuel flow rate is approximately zero. A fuel flow rate of approximately zero indicates that an overpressure shut-off may have occurred.

In the event that the computer determines that the evaluated second period 80 of the refueling operation includes at least one second portion 66, in between two first portions 64, the computer 24 determines that a premature shut-off event has occurred.

As another example, the computer 24 may identify at least one first portion with a first flow rate, the first portion in between two second portions with a second flow rate. The computer may determine that first flow rate is below the second flow rate by at least a predetermined difference, four example 4 gallons per minute. Based on the determination that there is at least one first portion between two second portions, and the difference between the first flow rate and the second flow rate is greater than the predetermined difference, the computer 24 may determine that a failure mode occurred during the refueling operation.

Alternatively, instead of identifying the one or more first portions 64 and the one or more second portions 66, the computer 24 may perform a numerical analysis on the fuel level data such as an r-squared analysis, as is known, on the second period 80 of the refueling operation during which no overpressure shutoff event is expected. For example, the computer 24 may perform the r-squared analysis on the fuel level data. The computer 24 may fit a straight line to the fuel level data, the fitted straight line indicative of a continuous fueling event. The computer 24 may then calculate an r-squared value of the data relative to the fitted straight line and determine whether the r-squared value is greater than a predetermined r-squared value. The predetermined r-squared value is in a range of from 0 to 100 with 100, wherein a higher number indicates a better fit of the fuel level data to the expected fuel level data. For example, the predetermined r-squared value may be set to be 90. An r-squared value greater than the predetermined r-squared value 90 indicates a sufficient linearity (continuity of fuel flow) during the second period 80 of the refueling operation to determine that no overpressure shut-off occurred. On the other hand an r-squared value that is less than or equal to 90 indicates that an overpressure shut-off likely occurred during the second period 80 of the refueling operation.

The above examples are non-limiting. The computer 24 may perform other types of analysis on the fuel level data in order to determine whether a premature shut-off event has occurred.

In the case of the computer 24 determines that no premature shut-off event has occurred, that is, that the refueling operation was successfully completed, the process 500 continues in a block 516. On the other hand, in the case that the computer 24 determines that a premature shut-off event occurred during the refueling operation, the process continues in a block 520.

In the block 516, the computer 24 updates data records associated with the fuel pump 30, refueling location 14, and the first vehicle 12. The computer 24 may, for example, store data indicating that the first vehicle 12 completed the refueling operation without a premature shut-off event together with a time stamp. The computer 24 may further store data indicating that the fuel pump 30 and/or refueling location 14 that participated in the refueling operation also completed the refueling operation without a premature shut-off event together with the time stamp.

In some cases, as noted above, the server 16 may maintain the data records for any one or all of the first vehicle 12, the fuel pump 30 and/or the refueling location 14. In these cases, the computer 24 may transmit a message to the server 16 indicating that the first vehicle 12 and the fuel pump 30 and/or refueling location 14 completed a refueling operation without a premature shut-off event. In these cases, upon recording the refueling operation data, the process 500 ends.

In the block 520 which follows in the block 514, the computer 24 and/or the server 16 stores data indicating that a premature shut-off event occurred during the refueling operation. Computer 24 and/or the server 16 may store data indicating the identity of the first vehicle 12, and the identity of the fuel pump 30 and/or a refueling location 14 that participated in the refueling operation, together with a time stamp.

Upon storing the data indicating that the refueling operation included a premature shut-off event, the process 500 continues in a block 522.

In the block 522, a computing device such as the first vehicle 12 computer 24 or the server 16 determines based on the updated data whether the stored data indicates a fuel pump 30 failure mode and/or a refueling location 14 failure mode. For example, the recorded data, including data from previous refueling operations, may indicate that a determined number of consecutive refueling operations at a particular fuel pump 30, or at a particular refueling location 14, included premature shut-off events. The number may be a fixed number, e.g., three. The number may be determined, based, for example, on empirical data for the type of fuel pump 30 indicating a relationship between frequency of premature shut-off events and a fuel pump 30 failure mode.

The stored data may include data from refueling operations by the first vehicle 12, and may further include data from refueling operations from one or more second vehicles 12. Using refueling data from multiple vehicles 12 may enable to the server 16 to more efficiently determine whether a fuel pump 30 or refueling location 14 has a failure mode. For example, refueling operations by two different vehicles 12 (e.g. the first vehicle 12 and a second vehicle 12) may indicate that a fuel pump 30 failure mode, rather than a vehicle 12 failure mode, is responsible for the premature shut-off event.

In the case that the computer 24 or the server 16 determines the fuel pump 30 or the refueling location 14 has a failure mode, the process 500 continues in a block 524. In the case of the computer 24 or the server 16 determines that the data does not indicate a fuel pump 30 or refueling location 14 failure mode, the process 500 continues in the block 526.

In the block 524, the computer 24 and/or server 16 designates the fuel pump 30 and/or the refueling location 14 as having the failure mode. The computer 24 or server 16 may set a flag in memory indicating that the fuel pump 30 or refueling location 14 is exhibiting a failure mode, and store additional information such as a time stamp and the nature of the failure mode.

Based on the data, the computer 24 and/or server 16 may, for a next refueling operation, instruct the first vehicle 12 to refuel at a different fuel pump 30 or refueling location 14. Further based on the data the computer 24 and/or server 16 may notify an operator of the fuel pump 30 and/or refueling location 14 that the fuel pump 30 and/or refueling location 14 has a failure mode.

Upon designating the fuel pump 30 and/or refueling location 14 as having the failure mode, the process 500 continues in the block 526.

In the block 526 the computer 24 or the server 16 determines whether the store data indicates that the first vehicle 12 has a failure mode associated with refueling. For example, the recorded data may indicate that a determined number of consecutive refueling operations of the first vehicle 12 included premature shut-off events. The number may be a fixed number, e.g., three. The number may be determined, based, for example, on empirical data for the type of vehicle that show the premature shut-off event frequency as a function of first vehicle 12 characteristics, such as clogging of the ventilation mechanism 52.

In the case that the computer 24 or server 16 determines a first vehicle 12 failure mode for refueling, the process 500 continues in a block 528. The case of the computer 24 server 16 does not determine a failure mode for the first vehicle 12, the process 500 ends.

In the block 528, the computer 24 or the server 16 designates the first vehicle 12 as having a failure mode. Computer 24 or the server 16 may for example set an internal flag in memory that the first vehicle 12 is currently exhibiting a failure mode. The computer 24 or server 16 may store additional data such as a time stamp, and the nature of the failure mode. Upon designating that the first vehicle 12 has failure mode, the process 500 continues in a block 530.

In a block 530, the computer 24 of the server 16 outputs the failure mode. For example, the first vehicle 12 computer 24 may alert the user via the first vehicle 12 HMI 22 that the first vehicle 12 is exhibiting the failure mode. The first vehicle 12 computer 24 may activate a warning lamp or display a symbol on a screen associated with the HMI 22.

In the case that the computer 24 determined the failure mode, the computer 24 may output the failure mode to the server 16.

Upon outputting the failure mode to the user and/or to the server 16, the process 500 continues in a block 532.

In the block 532, in the case of an autonomous first vehicle 12, the computer 24 or the server 16 may schedule servicing for the first vehicle 12. Alternatively, in the case of a non-autonomous first vehicle 12, the user may schedule servicing. Upon scheduling servicing, the process 500 continues in a block 534.

In the block 534, in the case of an autonomous first vehicle 12, the computer 24 navigates the first vehicle 12 to a service center. In the case of a non-autonomous first vehicle 12, the user navigates the first vehicle 12 to the service center. Upon operating the first vehicle 12 to a service center, process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system for autonomous operation of a vehicle comprising:
a computer programmed to:
receive, from a fuel level sensor in a vehicle fuel tank, during a refueling operation of the vehicle coupled to a fuel pump, first data indicating a fuel level in the vehicle selected according to first and second times between which an overpressure shutoff is not expected;
determine a flow rate based on the first data;
collect second data, the second data including data from previous refueling operations for one or both of the vehicle and the fuel pump;
determine, based on the first and second data, and when the flow rate is below a predetermined flow rate, a failure mode for the refueling operation for at least one of the vehicle and the fuel pump; and
output a refueling failure indication for the at least one of the vehicle and the fuel pump based on the failure mode to at least one of an interface and a server, wherein the first and second times are selected within a middle time period of the refueling operation that excludes a beginning time period at a beginning of the refueling operation and an ending time period at an end of the refueling operation, and further wherein a time period between the first time and the second time is greater than a predetermined time.

2. The system of claim 1, wherein the vehicle includes the computer.

3. The system of claim 1, wherein the computer is further programmed to:
identify the middle time period, including the first and second times, during which the overpressure shutoff is not expected.

4. The system of claim 3, wherein the computer is further programmed to:
identify third and fourth times included in the middle time period;
perform an r-squared analysis for a plurality of fuel levels between the third and fourth times; and
output the refueling failure indication when an r-squared value for the plurality of fuel levels is less than a predetermined value.

5. The system of claim 3, wherein the computer is further programmed to:
identify third and fourth times during the middle time period; and
analyze data indicating fuel levels selected according to the third and fourth times to determine a second flow rate, wherein outputting the refueling failure indication is based in part on the second flow rate being greater than a second predetermined flow rate.

6. The system of claim 3, wherein the computer is further programmed to:
identify third and fourth times during the middle time period; and analyze data indicating fuel levels selected according to the third and fourth times to determine a second flow rate, wherein outputting the refueling failure indication is based in part on a difference between the flow rate and the second flow rate being greater than a predetermined difference.

7. The system of claim 1, wherein the computer is further programmed to:
determine, based on the second data from the at least one of the vehicle and the fuel pump participating in the refueling operation, that the fuel pump includes the failure mode; and
drive the vehicle to a second fuel pump based on the determination that the fuel pump has the failure mode.

8. The system of claim 1, wherein the computer is further programmed to:
determine, based on the second data from the at least one of the vehicle and the fuel pump participating in the refueling operation, that the vehicle includes the failure mode; and
drive the vehicle to a service station.

9. The system of claim 1, wherein the computer is further programmed to: identify a beginning of the middle time period based on a percentage of fuel in the fuel tank.

10. The system of claim 1, wherein the computer is further programmed to: identify an end of the middle time period based on a percentage of a duration of the refueling operation.

11. A system for a vehicle comprising:
a fuel level sensor disposed in a vehicle fuel tank; and
a computer programmed to:
receive, from the fuel level sensor, fuel levels during a refueling operation of the vehicle coupled to a fuel pump;
identify first and second times during the refueling operation between which an overpressure shutoff is not expected, wherein the first and second times are selected within a middle time period of the refueling operation that excludes a beginning time period at a beginning of the refueling operation and an ending time period at an end of the refueling operation, and further wherein a time period between the first time and the second time is greater than a predetermined time;
analyze fuel levels selected according to the first and second times to determine a flow rate;
collect data from previous refueling operations for one or both of the vehicle and the fuel pump;
determine, based on the data from the previous refueling operations for one or both of the vehicle and the fuel pump, and when the flow rate is below a predetermined flow rate, a failure mode for at least one of the vehicle and the fuel pump; and
output a refueling failure indication based on the failure mode for the at least one of the vehicle and the fuel pump to at least one of a human-machine interface on the vehicle and a server.

12. The system of claim 11, wherein identifying the first and second times between which an overpressure shutoff is not expected includes identifying the middle time period, including the first and second times, during which the overpressure shutoff is not expected.

13. The system of claim 12, wherein the computer is further programmed to:
identify third and fourth times included in the first middle time period;
perform an r-squared analysis for a plurality of fuel levels between the third and fourth times; and
output the refueling failure indication when an r-squared value for the plurality of fuel levels is less than a predetermined value.

14. The system of claim 11, wherein the computer is further programmed to: identify a beginning of the middle time period based on a percentage of fuel in the fuel tank.

15. The system of claim 11, wherein the computer is further programmed to:
identify a beginning of the middle time period based on a percentage of fuel in the fuel tank.

16. A method for autonomous operation of a vehicle, comprising:
receiving, by a computer, from a fuel level sensor in the vehicle fuel tank in the vehicle coupled to a fuel pump, during a refueling operation, first data selected according to first and second times between which an overpressure shutoff is not expected,
determining a flow rate based on the first data;
collect second data, the second data including data from previous refueling operations for one or both of the vehicle and the fuel pump;
determine, based on the first and second data, and when the flow rate is below a predetermined flow rate, a failure mode for the refueling operation for at least one of the vehicle and the fuel pump; and
outputting a refueling failure indication based on the failure mode to at least one of an interface and a server, wherein the first and second times are selected within a middle time period of the refueling operation that excludes a beginning time period at a beginning of the refueling operation and an ending time period at an end of the refueling operation, and further wherein a time period between the first time and the second time is greater than a predetermined time.

17. The method of claim 16, further comprising:
identifying the middle time period, including the first and second times, during which the overpressure shutoff is not expected.

18. The method of claim 17, further comprising:
identifying third and fourth times included in the middle time period;
performing an r-squared analysis for a plurality of fuel levels between the third and fourth times; and
outputting the refueling failure indication when an r-squared value for the plurality of fuel levels is less than a predetermined value.

19. The method of claim 17, further comprising:
identifying third and fourth times during the first middle time period; and
analyzing data indicating fuel levels selected according to the third and fourth times to determine a second flow rate, wherein outputting the refueling failure indication is based in part on the second flow rate being greater than a second predetermined flow rate level.

20. The system of claim 16, wherein the computer is further programmed to: identify a beginning of the middle time period based on a percentage of a duration of the refueling operation.

* * * * *